May 23, 1967  M. ORAIN  3,320,846
RETENTION DEVICE
Filed Feb. 10, 1965
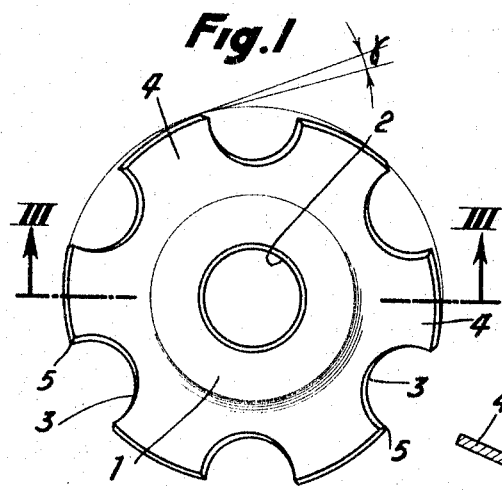
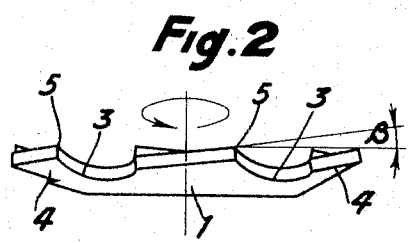
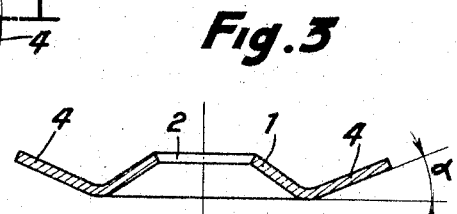
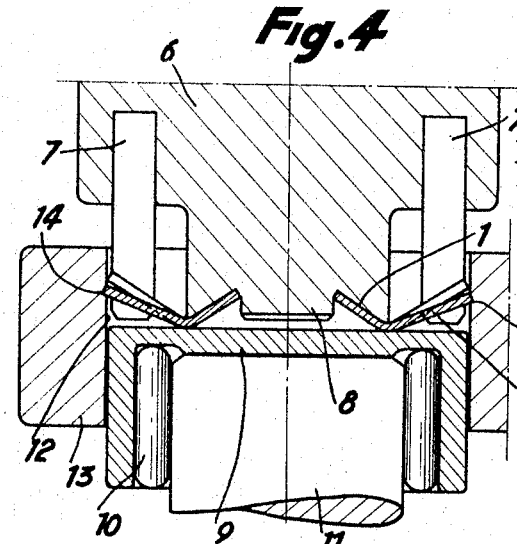
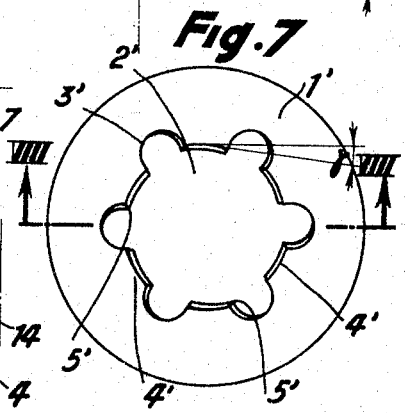
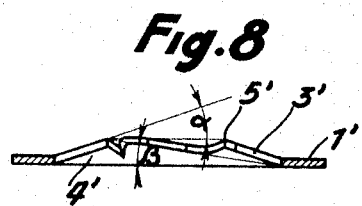
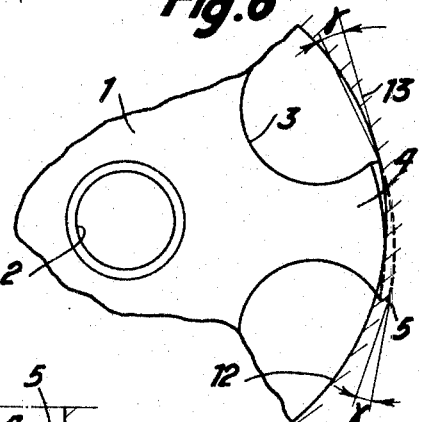
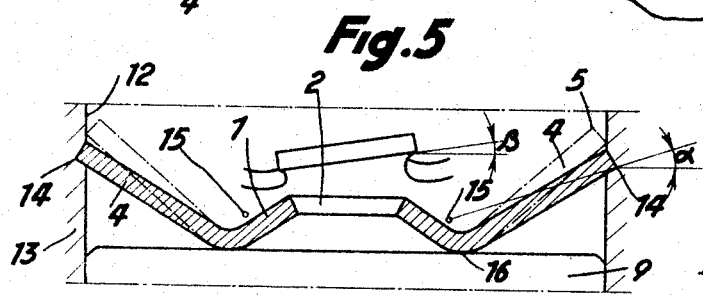
Inventor:
Michel Orain
BY Baldwin & Wight
Attorneys United States Patent Office 3,320,846
Patented May 23, 1967

3,320,846
RETENTION DEVICE
Michel Orain, Courbevoie, France, assignor to Glaenzer Spicer Societe Anonyme, Poissy, Seine-et-Oise, France, a corporation of France
Filed Feb. 10, 1965, Ser. No. 431,562
Claims priority, application France, Feb. 19, 1964, 964,359
5 Claims. (Cl. 85—36)

This invention relates to a device for axial retention of a mechanical part engaged in a bore or mounted on a shaft.

Numerous axial retention systems are at present in use, all of which derive from well known basic principles enabling the use of circular grooves, welding, or special machining to be avoided.

One of these known systems utilises a part of hard metal shaped to form a self-tapping screw which, on rotation, is able to form its own receiving female thread by cutting or driving back, or by combination of these two means, in the bore receiving said part.

This known system nevertheless has the following disadvantages:

(a) The screwdriving torque, which is already considerable for small diameters, becomes prohibitive for medium diameters;

(b) The tapping is difficult to start and parallelism of the self-tapping screw and the bore is very uncertain. The conicity, which would be necessary to start the tapping under good conditions, would entail a relatively great length which would be inacceptable for many purposes. In addition, conicity entails a negative backing off, which gives rise to friction and seizing. On the other hand, if effective backing off is effected, this is detrimental to the effective bearing surface of the thread flanks of the self-tapping screw against the threads formed in the bore after the part has been placed in position;

(c) Because of the considerable tapping torque, it is impossible to check that the screw has come into contact with the part to be retained, so that this type of retaining means cannot be used for certain purposes where the axial play or prestressing to be produced must be obtained accurately;

(d) When installed in parts subjected to vibration, acceleration, or elastic deformation, these self-tapping screws may come unscrewed, because they are retained only by friction.

Another system of axial retention is also known, which comprises using steel washers, the edges of which carry teeth disposed radially and having a slight slope towards the plane of these washers. Such washers are inserted into a bore which is slightly smaller than their outside diameter, until they strike against the parts to be retained axially and their teeth thus abut against the surface of the bore, the washers serving as axial retention means because of the friction existing between said teeth and the wall of the bores.

The disadvantages entailed by this known system are:

(a) A small support surface for the edges of the teeth against the wall of the bore; hence the resistance of axial retention of this type is therefore very limited.

(b) The possibility of sliding in the bore if for any reason the coefficient of friction is reduced through the introduction of a lubricant. Poor resistance to vibration and deformation of the bore results.

(c) The accurate adjustment of axial play or prestressing is obviously a difficult matter.

Another axial retention means is also known which is currently used in mechanical engineering, which consists in displacing, by plastic shearing or driving-back, a bead of metal until the latter strikes against the part to be retained, while this bead may be provided on the entire periphery or else only on one or more sectors of the bore.

The disadvantages entailed by this system are:

(a) Very considerable force required to form plastically the retaining means in the basic part. This force is generally of the order of magnitude of the resistance required for the axial retention, and often is even greater. This may be troublesome if it is desired to place the retaining systems accurately on a part which is relatively deformable in the direction of the axis of the bore.

(b) Having been upset, the metal loses part of its mechanical propreties. In addition, if the parent metal does not duly have the required plasticity, the upsetting may be faulty and ineffective.

The present invention has as object an axial retention device enabling a mechanical part to be held in an ideal position, without requiring a machined groove, an axial force, or the upsetting of metal, and which can be maintained at will against said part to be retained, either with no play or with a fixed amount of play, or on the contrary with slight pressure if so required. The play or pressure considered to be optimum for the purpose in question may be obtained independently of the machining tolerances which may exist in the elements to be assembled.

According to the present invention, a device for axial retention of a mechanical part comprises a member such as a washer, e.g., of spring steel, formed with a number of recesses to provide a number of arms which are inclined in relation to the plane perpendicular to the axis of the washer and towards said axis, so that said arms have sharp edges capable of cutting into a fixed anchorage surface and creating therein a corresponding number of screwthread starts when rotation about its axis is imparted to the washer.

By the term "washer" is understood in the present description not only, as in normal terminology, a round part perforated at its centre, but also any equivalent part for the desired purpose, such as a plate, disc, pastille, or the like, whether perforated or not.

Each of the arms inclined towards the axis of the washer may in addition be inclined perpendicularly to the radii of each arm, for example by a deflection tending to impart to its cutting edge a natural backing-off which increases the cutting power of said edge.

When the anchoring washer is to be used for retaining a mechanical part in a bore, the recesses are formed on the periphery of the washer and the arms formed by said recesses are inclined towards a bridge of the axis of the washer which is situated below the plane perpendicular to said axis, passing through the top edges of the arms.

When the anchoring washer is to be used to maintain a mechanical part on a shaft, recesses are formed on the edge of a central hole in the washer, and the arms are inclined towards a point on the axis of the washer situated above the plane perpendicular to said axis, passing through the top edges of the arms.

The device is described in greater detail below with reference to the accompanying drawing, in which:

FIG. 1 shows the anchoring washer viewed from above;
FIG. 2 shows the anchoring washer viewed in elevation;
FIG. 3 is a section on the line III—III in FIG. 1;
FIG. 4 shows the method of mounting the washer in a bore;
FIGS. 5 and 6 illustrate the mode of operation of the washer;
FIG. 7 shows the washer designed for locking on an axial shaft;
FIG. 8 is a section along the line VIII—VIII in FIG. 7.
Referring to the drawing, the retaining device forming the subject of the invention comprises a washer formed with a number of recesses, which washer is so shaped that it can easily be driven into a bore of a diameter slightly larger than its outside diameter, until it contacts the part to be retained, and can then be locked, either in the bore receiving said part or on a shaft or axle on which said part has been mounted, by rotation of the washer through a predetermined angle, the recesses of the washer having sharp edges adapted to create a corresponding number of groove or screwthread starts on the surface of the bore or of the shaft, as the case may be.

FIGURES 1 to 3 illustrate the form given to the retaining washer when it is to be used inside a bore and to be locked in the wall of the latter.

In the example illustrated, the washer 1 (FIGURES 1 and 2) which is preferably of spring steel, has an axial hole 2 and peripheral grooves 3 providing arms 4 which are inclined in relation to the plane perpendicular to the axis of the washer by a constant or varying angle, the value $\alpha$ (FIGURE 3) of which is determined as will be specified hereinbelow.

Viewed from the end, each arm has a slight slope $\beta$ (FIGURE 2). This slope, if provided, may be obtained in various ways and in particular by deflecting the arms; this slope will correspond to that of the pitch of anchoring screwthreads. In addition, by combination with the inclination $\alpha$, it will provide a natural backing-off of the outside arc of each arm, this backing-off being represented by the angle $\gamma$ measured in relation to the tangent to the circumference to which the washer is cut (FIGURE 1). This value of the backing-off angle $\gamma$ (or angle or relief) may be modified independently of the angles $\alpha$ and $\beta$, by preparing the cutting tools used to produce the part in such a manner that the outside arc of each arm has its centre displaced in relation to that of the part. This backing-off angle $\gamma$ permits and guides the radial penetration of the cutting angle 5 of each arm of the washer during the locking rotation $\varphi$, while the angle $\beta$ guides the axial penetration of the cutting edge.

The locking rotation to be given to the washer 1 in order to enable its cutting edges 5 to form screwthread starts on the surface of the bore may be imparted to the washer by means of a driver tool 6 (FIGURE 4) comprising studs 7 engaging in the recesses 3 of the washer, as well as a central finger 8 introduced into the axial hole 2 in the latter.

It should be observed that the central finger 8 plays no part in the locking, and therefore may be replaced by any other device, hollowed or in relief, or even if necessary be unnecessary.

In order to show how a washer of this type works, it will be assumed that it is to be used to retain a bush 9 (FIGURE 4) of a needle bearing 10 situated at the end of a cardan-joint cross-pin 11, in a bore 12 formed in one of the jaws of the joint.

When the washer is placed in position, after the stage of axially driving it into contact with the bush 9 to be retained, the curved portion becomes slightly elastic and leaves axial play between it and the part to be retained. During the second stage of placing in position or locking, in dependence on the value of the rotation $\varphi$ and the values of the angles $\alpha$, $\beta$, and $\gamma$, the washer may leave slight clearance between it and the part to be retained, eliminate such clearance, or apply a force against the part to be retained, or even push it axially a predetermined distance backwards. It is obvious that these positioning conditions will be repeated exactly and faithfully for every assembly made with the same type of washer to which the same locking rotation angle $\varphi$ will be applied.

In the course of this rotation, the cutting edges 5 of the washer engage in the wall of the bore, as shown at 14 in FIGURE 4, and the washer then resumes a shape close to its normal shape before installation.

The simplified study given below explains the principle of locking the washer in the very accurate position desired, and also the manner in which, at will, there is obtained a predetermined clearance between said washer and the part to be retained, or contact with prestressing, or else an axial displacement of a fixed value of the part to be retained.

Consider the washer 1 (FIGURES 5 and 6) introduced by sliding into the bore 12 after radial displacement of the arms 4. After the locking rotation $\varphi$ have taken place, the edge 5 will then assume the position 14. $\alpha$ is here the angle formed by the straight line, joining the cutting edge 5 to the elastic centre 15 of the arm illustrated, with the horizontal plane containing all the cutting edges.

The following geometrical relations are easily established:

Axial advance of the cutting edge from 5 to 14:

$$b = \varphi r \, \text{tg} \, \beta \qquad (1)$$

Radial expansion of the cutting edge thereof:

$$c = \varphi r \, \text{tg} \, \gamma \qquad (2)$$

Axial backward movement of the point 16 in relation to the cutting edge:

$$a = \frac{c}{\text{tg} \, \alpha} \qquad (3)$$

or, utilising (2), $$a = \varphi r \frac{\text{tg} \, \gamma}{\text{tg} \, \alpha}$$

Now, the washer applied its axial action to the part to be retained through the zone of contact 16. During the locking rotation $\varphi$, the axial displacement of this zone 16 will be:

$$u = b - a = \varphi r \, \text{tg} \, \beta - \varphi r \frac{\text{tg} \, \gamma}{\text{tg} \, \alpha}$$

or:

$$u = \varphi r \left( \text{tg} \, \beta - \frac{\text{tg} \, \gamma}{\text{tg} \, \alpha} \right) \qquad (4)$$

This simple formula clearly shows the ease with which the clearances, prestressing, or axial displacements may be calculated and obtained.

The proportion between the axial displacement $u$ of the zone of contact 16 and the locking rotation $\varphi$ is for example of the order of 5/1,000 mm. per degree of locking rotation, which enables the positioning to be effected, starting from the effecting of abutment, with as much accuracy as is desired.

If it is desired that the zone of contact 16 should not be displaced at the moment of locking, it is sufficient (see Formula 4) to ensure that:

$$\text{tg} \, \beta = \frac{\text{tg} \, \gamma}{\text{tg} \, \alpha}$$

In this case moreover, locking is obtained for all the practical values of the angle of rotation $\varphi$. If a slight backward axial movement is desired, the following adjustment is made:

$$\text{tg} \, \beta < \frac{\text{tg} \, \gamma}{\text{tg} \, \alpha}$$

If, on the contrary, axial prestressing is desired, the following adjustment is made:

$$\text{tg} \, \beta > \frac{\text{tg} \, \gamma}{\text{tg} \, \alpha}$$

In these last two cases, the clearance or prestressing produced will, for one and the same type of locking washer, be proportional to the rotation $\varphi$.

In the example described above, the locking washer forming the subject of the invention is applied to the retention of a mechanical part introduced into a bore. However, the washer may conversely be utilised to retain a mechanical part mounted on a shaft. In this case the washer 1′ (FIGS. 7 and 8) has a central hole 2′ the circular edge of which is recessed.

The recesses 3' form arms 4', cutting edges 5' of which act on the surface of the aforesaid shaft in the same manner as the edges 5 of the previously described washer act on the inside surface of the bore 12. The axial retention device constructed according to the invention has the following advantages over known systems:

(1) The locking of the axial retention device is effected without axial force. Only a slight torque, in the direction of the axis of the bore, is applied to the washer at the moment when the correctly backed-off cutting edges cut their support grooves in the bore. It follows that the part containing the bore is not subjected to stressing in the direction of this bore. Thus no support or bracing is necessary when these washers are installed, even when great accuracy of positioning is required on relatively elastic parts.

(2) The locking is effected at will with predetermined clearance between the part to be retained and the locking washer, or else without clearance, or with the desired tightening as the case may be, and this is done in a reliable manner for large series of parts, whatever the variations of axial position of the part to be retained.

(3) The locking obtained gives great axial resistance both to static forces and to alternating stresses, for the following reasons:

(a) All the peripheral surfaces or edgefaces of the washer bear over their entire width and length in the incipient grooves which they have themselves formed;

(b) The supporting metal is healthy, both in the support zone and in its immediate proximity, because there have been no plastic deformation, shearing of metal, or cold hammering.

(4) The locking withstands both elastic deformations of the bore and alternating stresses and vibrations. The rotational locking is not in fact due to wedging or friction, but to a statically stable rotational position of the locking washer.

It will, in fact, be seen that, in the direction of rotation corresponding to the locking, the crown of the washer cannot turn spontaneously, because each front edge abuts against the end of the groove which it has formed. Any rotation in the opposite direction is likewise impossible, because it would entail the elastic radial compression of the washer, in which case the face edges would have to ascend the slope of the locking grooves.

(5) The locking crown can be removed. In order to do this it is sufficient to apply to the locking washer a rotation in the opposite direction to the direction of rotational locking, until it comes out of the bore.

What I claim is:

1. A device for axial retention of a mechanical part in engagement with a locking surface internally of a circular section upon partial relative rotation between said part and said section comprising a circular sheet material member having a central portion joined by a radius portion to a terminal peripheral portion, a plurality of recesses in said terminal peripheral portion defining a plurality of radially outwardly directed arms, said member being of a generally W-shaped configuration as defined by an axial plane passing through the central portion, the radius portion and any one of said arms, each arm terminating in a cutting edge, and each arm being inclined in a circumferential direction to a plane normal to the axis of said member to impart a backing-off angle to each cutting edge thereby increasing the cutting power of the cutting edges.

2. The device as defined in claim 1 wherein said member includes a central hole defined by an edge in said central portion adapted to guidingly receive a portion of a tool for imparting rotation to the member for effecting locking engagement between the member and a locking surface.

3. The device as defined in claim 1 wherein said member includes a central hole defined by a peripheral innermost edge of said central portion adapted to guidingly receive a portion of a tool for imparting rotation to the member for effecting locking engagement between the member and a locking surface, each cutting edge having leading and trailing edge portions, one of said cutting edge portions of each cutting edge being disposed above a plane taken through said peripheral edge and normal to the axis of said member, and another of said cutting edge portions of each cutting edge being disposed below said last-mentioned plane.

4. The device as defined in claim 1 wherein said member includes a central hole defined by a peripheral innermost edge of said central portion adapted to guidingly receive a portion of a tool for imparting rotation to the member for effecting locking engagement between the member and the locking surface, each cutting edge being convexly curved, each of the plurality of recesses being defined by slots opening radially outwardly away from the axis of said member, each cutting edge having leading and trailing edge portions, each trailing edge portion being disposed above a plane taken through said peripheral edge and normal to the axis of said member, and each leading edge being disposed below said last-mentioned plane.

5. The device as defined in claim 4 wherein said member is housed internally of said circular section, the diameter of said member is normally slightly larger than the diameter of said circular section, and said cutting edges are received in discontinuous cuts of the material of said circular section formed upon partial relative rotation between the member and the section subsequent to the pure axial assembly thereof.

References Cited by the Examiner

UNITED STATES PATENTS

| | | | |
|---|---|---|---|
| 2,712,262 | 7/1955 | Knohl | 85—36 |
| 2,862,413 | 12/1958 | Knohl | 85—36 |
| 2,969,705 | 1/1961 | Becker | 85—36 |
| 3,036,793 | 5/1962 | Becker | 85—36 |
| 3,205,758 | 9/1965 | Fischer | 85—36 |
| 3,212,391 | 10/1965 | Duffy | 85—36 |

FOREIGN PATENTS

| | | |
|---|---|---|
| 60,127 | 3/1954 | France. |
| 780,237 | 7/1957 | Great Britain. |

CARL W. TOMLIN, *Primary Examiner.*

EDWARD C. ALLEN, MARION PARSONS, JR.,
*Examiners.*